United States Patent
Jeon et al.

(10) Patent No.: US 12,228,930 B2
(45) Date of Patent: Feb. 18, 2025

(54) AIRCRAFT DOCKING GUIDANCE SYSTEM USING 3D LASER SCANNER AND CONTROL METHOD FOR THE SAME

(71) Applicant: ANSE Technologies Co., Ltd., Seoul (KR)

(72) Inventors: Joong Sung Jeon, Busan (KR); Yeong-Woong Jeon, Seoul (KR); Im-Roc Do, Seoul (KR); Yong An Lee, Seoul (KR)

(73) Assignee: ANSE Technologies Co., Ltd., Seoul (KR)

( * ) Notice: Subject to any disclaimer, the term of this patent is extended or adjusted under 35 U.S.C. 154(b) by 380 days.

(21) Appl. No.: 17/719,844

(22) Filed: Apr. 13, 2022

(65) Prior Publication Data

US 2022/0413498 A1    Dec. 29, 2022

(30) Foreign Application Priority Data

Apr. 21, 2021    (KR) .......................... 10-2021-0051662

(51) Int. Cl.
| | | |
|---|---|---|
| *G05D 1/00* | (2024.01) | |
| *B64F 1/00* | (2024.01) | |
| *G01S 7/48* | (2006.01) | |
| *G01S 17/89* | (2020.01) | |
| *G06V 10/10* | (2022.01) | |

(52) U.S. Cl.
CPC ........... *G05D 1/0202* (2013.01); *B64F 1/002* (2013.01); *G01S 7/4802* (2013.01); *G01S 17/89* (2013.01); *G06V 10/10* (2022.01)

(58) Field of Classification Search
None
See application file for complete search history.

(56) References Cited

U.S. PATENT DOCUMENTS

| | | | |
|---|---|---|---|
| 6,100,964 A * | 8/2000 | De Cremiers | B64F 1/002 382/104 |
| 6,928,363 B2 * | 8/2005 | Sankrithi | B64F 1/002 244/50 |
| 9,459,119 B2 * | 10/2016 | Lin | B64F 1/002 |
| 2003/0208861 A1 * | 11/2003 | Hutton | B64F 1/3055 14/71.5 |

(Continued)

FOREIGN PATENT DOCUMENTS

| | | | |
|---|---|---|---|
| KR | 101314566 B1 * | 10/2013 | |
| KR | 10-2017-0082686 A | 7/2017 | |
| WO | WO-2017119545 A1 * | 7/2017 | B64F 1/22 |

*Primary Examiner* — Raul J Rios Russo
*Assistant Examiner* — Carl F. R. Tchatchouang
(74) *Attorney, Agent, or Firm* — Studebaker & Brackett PC

(57) ABSTRACT

Provided is an aircraft docking guidance system using a three-dimensional (3D) laser scanner, including a laser scanner configured to acquire data related to aircraft docking guidance and docking control; a database configured to store information related to specifications and characteristics of each aircraft type that is a target of the aircraft docking guidance and docking control using the laser scanner; a communicator configured to transmit and receive information between the laser scanner and the database; and a data analysis decision algorithm processing unit configured to determine information of an object by comparing image information acquired through the laser scanner and information stored in the database.

10 Claims, 9 Drawing Sheets

(56) References Cited

U.S. PATENT DOCUMENTS

2013/0060457 A1* 3/2013 Breuing .................. G01S 7/41
701/120
2015/0142218 A1* 5/2015 Lin ........................ B64F 1/002
701/3

* cited by examiner

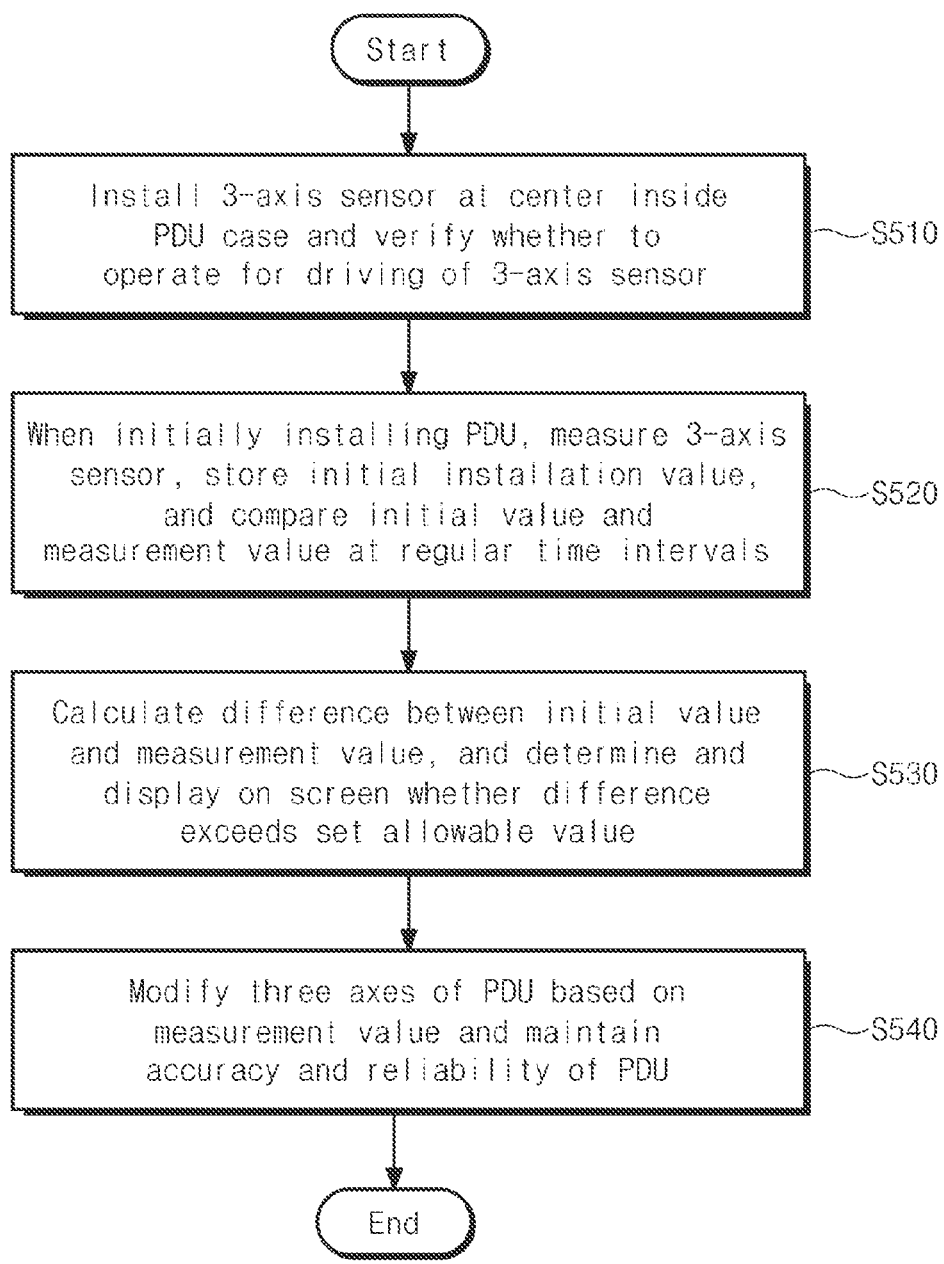

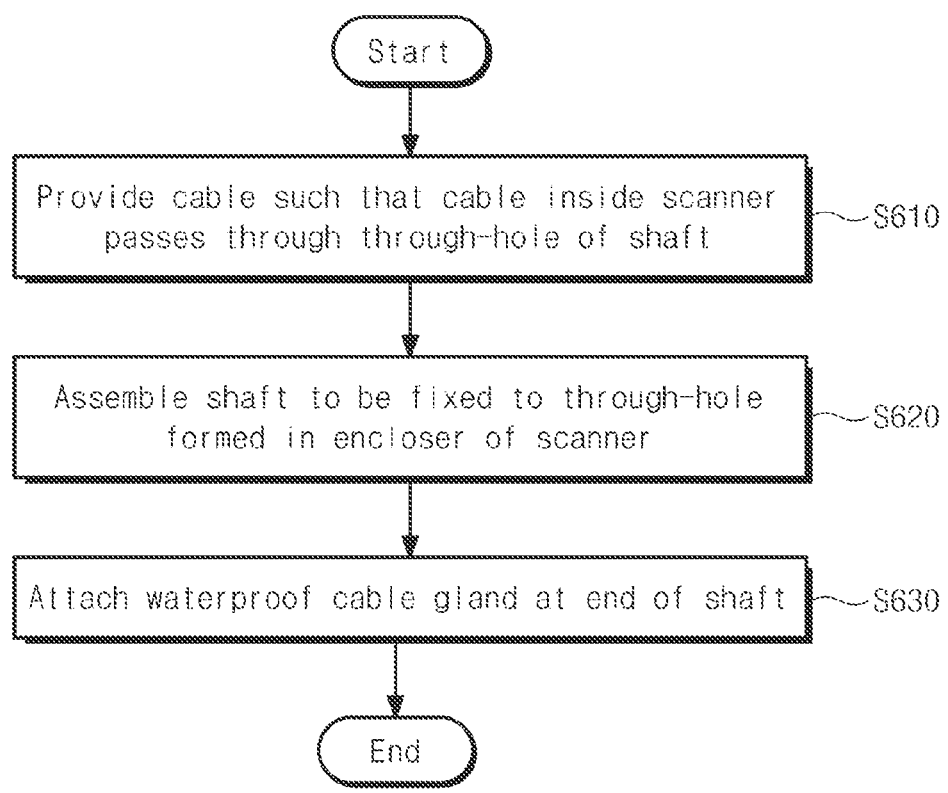

AIRCRAFT DOCKING GUIDANCE SYSTEM USING 3D LASER SCANNER AND CONTROL METHOD FOR THE SAME

CROSS-REFERENCE TO RELATED APPLICATIONS

This application claims the benefit under 35 USC § 119(a) of Korean Patent Application No. 10-2021-0051662 filed on Apr. 21, 2021 in the Korean Intellectual Property Office, the entire disclosure of which is incorporated herein by reference for all purposes.

BACKGROUND

1. Field

At least one example embodiment relates to an aircraft docking guidance system using a three-dimensional (3D) laser scanner and an aircraft docking control method using the same and, more particularly, to a system that enables an aircraft docking guidance by analyzing information, such as a shape (overall length, overall height, a fuselage size, an angle relative to a center, etc.), a position, a distance, and a model of an aircraft using a 3D laser scanner and an aircraft docking control method using the system.

2. Description of Related Art

In the related art, to guide an aircraft entering an airport runway to dock at an accurate position, a marshaller guides an aircraft pilot to a docking place by manually instructing a heading direction and a stop position of the aircraft through hand signals.

However, in such a manual docking guidance method, when a problem or a failure occurs at a specific apron when aircrafts take off and land in a large airport with many gates, it is difficult for an airport command center to notify or promptly verify and take an action for the occurrence of the problem or the failure. There is a problem in securing manpower due to a large number of docking guidance personnel.

As a conventional aircraft model identification technology conceived in consideration of such circumstances, an aircraft view docking guidance system including a charge coupled device (CCD) camera, a display, a processing unit, and an indicator and configured to capture a three-dimensional (3D) image of an aircraft entering an apron with the CCD camera from the apron, to process the 3D image such that only an outline of the aircraft remains, and to display calculation results, for example, a model, a distance, and a lateral deviation of the aircraft is described in Korean Patent No. 10-0246556 titled an "aircraft docking position instruction system."

The aircraft docking position instruction system acquires an image file of the aircraft with the CCD camera and then recognizes the outline of the aircraft through an image processing process, compares the image file with a real image acquired based on simulation results of distance and angle changes using a prebuilt aircraft database, determines a model of the aircraft from matching data, calculates a current distance and angle of the aircraft using a triangulation, and displays calculation results.

Therefore, a conventional image processing method may not acquire information in real time, such as a shape (overall length, overall height, a fuselage size, an angle relative to a center, etc.), a position, a distance, and a model of an aircraft by an environment effect such as weather, for example, sunlight, fog, rain, and hail, and may have difficulty in providing information for aircraft docking guidance on the premise of an accurate determination of an aircraft model.

SUMMARY

At least one example embodiment provides a system that may acquire information in real time, such as a shape (overall length, overall height, a fuselage size, an angle relative to a center, a centerline, etc.), a position, a distance, and a model of an aircraft using a 3D laser scanner and an aircraft docking control method using the system.

According to an aspect of at least one example embodiment, there is provided an aircraft docking guidance system using a three-dimensional (3D) laser scanner, the aircraft docking guidance system including a laser scanner configured to acquire data related to aircraft docking guidance and docking control; a database configured to store information related to specifications and characteristics of each aircraft model that is a target of the aircraft docking guidance and docking control using the laser scanner; a communicator configured to transmit and receive information between the laser scanner and the database; and a data analysis decision algorithm processing unit configured to determine information of an object by comparing image information acquired through the laser scanner and information stored in the database.

According to an example embodiment, the aircraft docking guidance system may further include a display configured to display information generated by the data analysis decision algorithm processing unit on a pilot guidance indicator; and an aircraft controller configured to enable an automatic aircraft control based on information transmitted to the display.

According to an example embodiment, the laser scanner may include a laser transceiver configured to emit a laser and receive the laser reflected by the object; a distance measurement device configured to measure a distance from the object based on a transmission time and a reception time of the laser; and an image data scanning device configured to generate image data by scanning a centerline of the aircraft and a stand in which the aircraft is to dock.

According to an example embodiment, the laser scanner may be configured to scan characteristic point groups of objects within an area in which entry of the aircraft is expected using a 3D scanner, and the data analysis decision algorithm processing unit may be configured to generate objects by determining distances between the point groups from the scanned point groups, and to when the generated objects are determined as an object with a predetermined size or more that is estimated as the aircraft, compare the objects determined as the aircraft to an aircraft profile. The aircraft profile may be information about aircraft specifications that include a length, a height, a width, an engine-to-engine distance, and an engine size of the aircraft.

According to an example embodiment, the data analysis decision algorithm processing unit may be configured to determine an inclination of an engine based on an object that is estimated as the engine upon entry of the aircraft, and to verify a number of point groups formed at both engine positions based on a point that is estimated as a nose of the aircraft and when the verified number of point groups is greater than or equal to a predetermined number, determine a corresponding model of the aircraft.

According to an example embodiment, the aircraft controller may be configured to perform an initialization operation of acquiring inclination information of pitch, roll, and yaw corresponding to the respective axes using a 3-axis sensor installed in a pilot display unit (PDU) and storing the acquired inclination information in the database as an initial value, and to perform a user modification operation of acquiring the inclination information of the respective axes using the 3-axis sensor of the PDU, comparing the acquired inclination information to the initial value, and in response to deviation from an allowable value, notifying a user through the PDU, and modifying three axes of the 3D scanner using a maintenance tool (MTT).

According to an example embodiment, the aircraft controller may be configured to perform an initialization operation of acquiring inclination information of pitch, roll, and yaw corresponding to the respective axes using a 3-axis sensor installed in a PDU and storing the acquired inclination information in the database as an initial value, and to perform an automatic modification operation of acquiring the inclination information of the respective axes using the 3-axis sensor of the PDU, comparing the acquired inclination information to the initial value, and in response to deviation from an allowable value, automatically modifying a 3-axis inclination value of the 3D scanner and storing the modified value as the initial value.

According to an example embodiment, the aircraft controller may be configured to place three points of a scannable object at a start point and an end point from a centerline on a stand in which the aircraft is to dock, to scan the stand using a 3D scanner, to display a start point object of the centerline to be clicked on a screen generated with scanned data, to when the object is clicked on the screen, designate the clicked object as a first point (FP) of the centerline, to display an end point object of the centerline to be clicked on the screen generated with the scanned data, to click the object on the screen and designate the clicked object as a second point (SP) of the centerline, and to set the centerline using the FP and the SP.

According to an example embodiment, the aircraft controller may be configured to store an initial value for installation using a 3-axis sensor at an initial installation of a PDU and compare the initial value and a measurement value, to when a difference between the initial value and the measurement value exceeds an allowable value, notify that the difference exceeds the allowable value through the PDU and a manual control panel (MCP), and to modify a 3-axis inclination value of the PDU such that the difference between the initial value and the measurement value does not exceed the allowable value.

According to an example embodiment, the aircraft controller may be configured to learn a stop error due to a time difference between a point in time at which a stop sign displayed when guiding the aircraft to stop is recognized and a point in time at which the aircraft is stopped, using bigdata.

According to an example embodiment, the aircraft controller may be configured to store first type data that includes a distance indicating the stop sign displayed when guiding the aircraft to stop, a distance at which the aircraft is stopped, the stop error, and an aircraft model, to store second type data related to an environmental factor that includes weather associated with rain, snow, and fog, a PDU installation height, and a PDU installation angle, to perform statistics and learning on the first type data and the second type data by using an aircraft model, a stopping distance, and the environmental factor, and to automatically adjust a display timing of the stop sign displayed when guiding the aircraft to stop using the learned first type data and second type data.

According to some example embodiments, there may be provided an aircraft docking guidance system using a 3D laser scanner and an aircraft docking control method using the same that may scan a moving aircraft in real time using a laser and may acquire information, such as a shape (overall length, overall height, a fuselage size, an angle relative to a center, a centerline, etc.), a position, a distance, and a model of the aircraft as a 3D image.

Also, according to some example embodiments, there may be provided an aircraft docking guidance system using a 3D laser scanner and an aircraft docking control method using the same that may operate both day and night by reducing a measurement error caused by weather effect, such as sunlight, fog, rain, and hail.

Also, according to some example embodiments, there may be provided an aircraft docking guidance system using a 3D laser scanner and an aircraft docking control method using the same that may display a real-time situation on a pilot guidance indicator, may provide information through a manual control of an aircraft, and may perform a stable aircraft docking control through a central control device, a remote-control device, and an automatic control device.

The aforementioned features and effects of the disclosure will be apparent from the following detailed description related to the accompanying drawings and accordingly those skilled in the art to which the disclosure pertains may easily implement the technical spirit of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 7 is a flowchart illustrating an example of a method of verifying and correcting a physical distortion of a pilot display unit (PDU) case according to an example embodiment;

FIG. 9 is a flowchart illustrating a scanner assembly method for preventing a cable damage in an aircraft docking control method according to an example embodiment.

DETAILED DESCRIPTION

Figure 1:
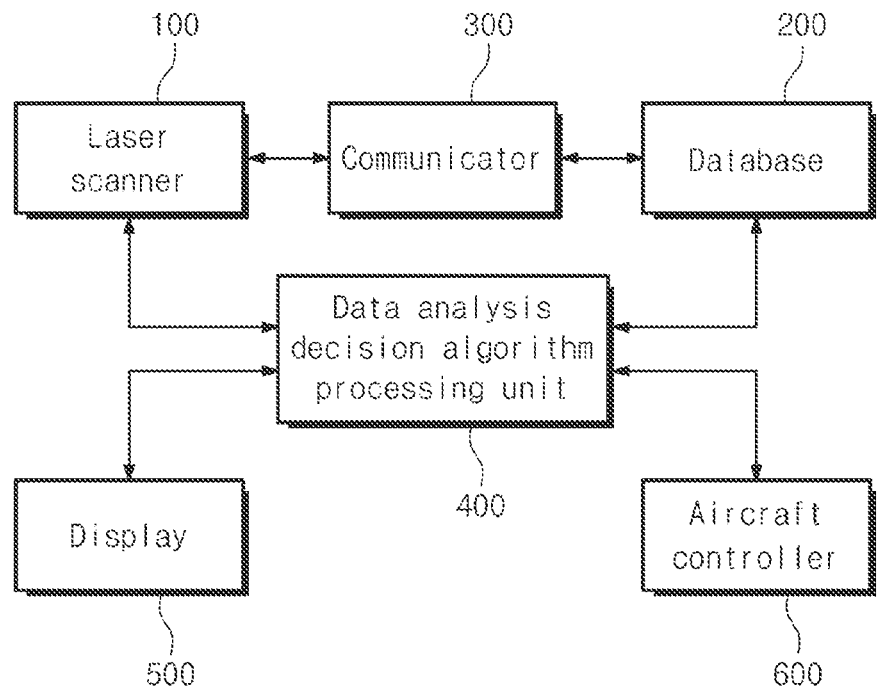
FIG. 1 is a diagram illustrating an example of a configuration of an aircraft docking guidance system using a three-dimensional (3D) laser scanner according to an example embodiment.

The aforementioned features and effects of the disclosure will be apparent from the following detailed description related to the accompanying drawings and accordingly those skilled in the art to which the disclosure pertains may easily implement the technical spirit of the disclosure.

Various modifications and/or alterations may be made to the disclosure and the disclosure may include various example embodiments. Therefore, some example embodiments are illustrated as examples in the drawings and described in detailed description. However, they are merely intended for the purpose of describing the example embodiments described herein and may be implemented in various forms. Therefore, the example embodiments are not construed as limited to the disclosure and should be understood to include all changes, equivalents, and replacements within the idea and the technical scope of the disclosure Although terms of "first," "second," and the like are used to explain various components, the components are not limited to such terms. These terms are used only to distinguish one component from another component.

Unless otherwise defined herein, all terms used herein including technical or scientific terms have the same meanings as those generally understood by one of ordinary skill in the art.

Terms defined in dictionaries generally used should be construed to have meanings matching contextual meanings in the related art and are not to be construed as an ideal or excessively formal meaning unless otherwise defined herein.

Hereinafter, the example embodiments are described with reference to the accompanying drawings such that those skilled in the art may easily carry out the disclosure. When it is determined that detailed description related to a known function or configuration unnecessarily obscures the gist of the disclosure in describing the example embodiments, the detailed description is omitted.

Hereinafter, an aircraft docking guidance system using a three-dimensional (3D) laser scanner and an aircraft docking control method using the same according to an example embodiment will be described with reference to the accompanying drawings. FIG. 1 is a diagram illustrating an example of a configuration of an aircraft docking guidance system using a 3D laser scanner according to an example embodiment.

Referring to FIG. 1, the aircraft docking guidance system may include a laser scanner 100, a database 200, a communicator 300, and a data analysis decision algorithm processing unit 400. The data analysis decision algorithm processing unit 400 may also be referred to as an algorithm processing unit or a data processing unit. Also, the aircraft docking guidance system may be configured to further include a display 500 and an aircraft controller 600.

The laser scanner 100 may be configured to acquire data related to aircraft docking guidance and docking control. The database 200 may be configured to store information related to specifications and characteristics of each aircraft model that is a target of the aircraft docking guidance and docking control using the laser scanner 100. The communicator 300 may be configured to transmit and receive information between the laser scanner 100 and the database 200.

The data analysis decision algorithm processing unit 400 may be configured to compare information acquired through the laser scanner 100 and information stored in the database 200. The data analysis decision algorithm processing unit 400 may be configured to compare the acquired image information and the stored information and to determine information of a target. The display 500 may be configured to display information generated by the data analysis decision algorithm processing unit 400 on a pilot guidance indicator. The aircraft controller 600 may be configured to enable an automatic aircraft control based on information transmitted to the display 500.

Figure 2:
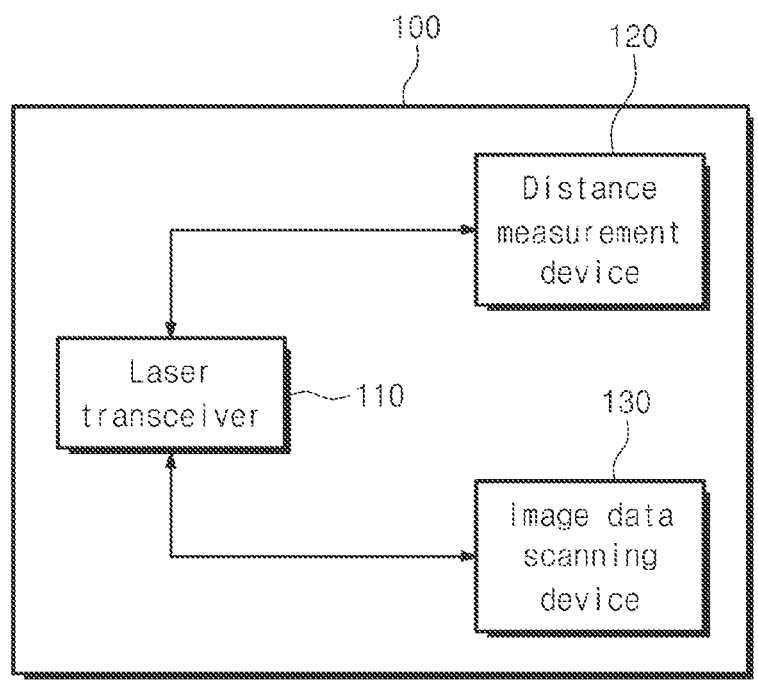
FIG. 2 is a diagram illustrating an example of a configuration of a laser scanner corresponding to a 3D laser scanner according to an example embodiment.

FIG. 2 is a diagram illustrating an example of a configuration of the laser scanner 100 corresponding to a 3D laser scanner according to an example embodiment. Referring to FIG. 2, the laser scanner 100 may include a laser transceiver 110, a distance measurement device 120, and an image data scanning device 130.

The laser transceiver 110 may be configured to transmit a laser and to receive the laser reflected by the object. The distance measurement device 120 may operatively couple to the laser transceiver 110. The distance measurement device 120 may be configured to measure a distance from the object based on a transmission time and a reception time of the laser. The image data scanning device 130 may operatively couple to the laser transceiver 110. The image data scanning device 130 may be configured to generate image data by scanning a centerline of the aircraft and a stand in which the aircraft is to dock. Although the image data scanning device 130 may be implemented as an image camera device, it is provided as an example only.

Hereinafter, a method of synchronizing guidance information of an aircraft docking guidance system and image data of an image camera is described.

A aircraft docking guidance system includes an image camera. The image camera captures a stand image and provides the captured stand image to an operator. The provided stand image is stored in a server and used for an occurrence of the accident or an accident investigation after the accident through synchronization with guidance information of the aircraft docking guidance system.

The guidance information of the aircraft docking guidance system includes aircraft entry information, for example, an accurate distance, position, and velocity based on a center guidance line and a stop guidance line, and the guidance information is stored in the system with time information that is synchronized with an airport time server from an aircraft entry to an aircraft stopping.

The image camera records the stand regardless of presence or absence of aircraft entry, stores a corresponding recording in the server, and stores a separate recording from a time at which the aircraft entry is scheduled to a time at which the aircraft entry is terminated in the system. The image information includes time information synchronized with the airport time server.

The image information may make it easy to intuitively understand a status of an entering aircraft. However, with the image information alone, it is difficult to determine an accurate distance, position, and velocity. Therefore, the image information may be synchronized with the guidance information of the aircraft docking guidance system and may assist intuitive understanding by simultaneously displaying a distance, a position, and a velocity of the entered aircraft.

Image data and guidance information simultaneously have the time of the synchronized airport time server and are synchronized using the time.

A reproduction program of synchronized data may be reproduced by selecting the image data or the guidance information. Each piece of data is used to display information of the same time zone on a screen using read time information.

When it is impossible to provide the time of the airport time server, synchronization optimization is performed by analyzing the guidance information in unit of unit information and by analyzing the image data in unit of an image keyframe based on a start point in time of the guidance information and a start point in time of the image data.

The laser scanner 100 may scan characteristic point groups of objects and may compare objects determined by the data analysis decision algorithm processing unit 400 as the aircraft to an aircraft profile. Here, the laser scanner 100 may be configured to scan characteristic point groups of objects within an area in which entry of the aircraft is expected using a 3D scanner.

The data analysis decision algorithm processing unit 400 may be configured to generate objects by determining distances between the point groups from the scanned point groups. When the generated objects are determined as an object with a predetermined size or more that is estimated as the aircraft, the data analysis decision algorithm processing unit 400 may compare the objects determined as the aircraft to the aircraft profile. Here, the aircraft profile may be configured as information about aircraft specifications that include a length, a height, a width, an engine-to-engine distance, and an engine size of the aircraft.

Hereinafter, a method of constructing aircraft specifications using the 3D scanner of the aircraft docking guidance system is described.

The aircraft docking guidance system generates the aircraft profile based on specifications information of the aircraft to guide, compares the generated aircraft profile to 3D data information of the entering aircraft, determines a model of the aircraft, and guides the aircraft based on a guidance centerline and a guidance stop line.

The aircraft profile is generated based on a fuselage size, an engine size, a wing size, a nose height, a nose-to-engine distance, and an engine-to-engine distance provided from an aircraft manufacturer. Since it is impossible to generate the aircraft profile without data from the aircraft provider, a method of extracting aircraft specifications information using the 3D scanner of the aircraft docking guidance system is used when such information is not provided.

A method of constructing aircraft specifications information is performed as follows: Wait until the aircraft is completely stopped after entering a stand. Since it is difficult to estimate a size of the aircraft, an approximate size of the aircraft is estimated by starting a scan up to a limit angle and distance of the 3D scanner. When the approximate size of the aircraft is estimated, the system precisely scans only the range and finds characteristics of a fuselage, an engine, and a wing of the aircraft.

Although positions and sizes of the fuselage, the noise, the engine, and the wing of the aircraft differ from each other, they have similar shapes at all times. Therefore, a corresponding position may be specified with scanned data and specifications information of the aircraft may be generated using the specified position.

When the aircraft is scanned from the front, a position of the nose of the aircraft is at a distance closest from the scanned position and the engine is in a form of a circular object on each of the left and the right based on the nose. A distance between a center of the circular object and the position of the nose is a nose-to-engine distance and a distance between centers of the circular objects present on the left and the right, respectively, is an engine-to-engine distance.

Also, the data analysis decision algorithm processing unit 400 may determine a corresponding model of the aircraft. Here, the data analysis decision algorithm processing unit 400 may determine an inclination of an engine based on an object that is estimated as the engine upon entry of the aircraft. Also, the data analysis decision algorithm processing unit 400 may verify a number of point groups formed at both engine positions based on a point that is estimated as a nose of the aircraft and when the verified number of point groups is greater than or equal to a predetermined number, may determine a corresponding model of the aircraft.

The aircraft controller 600 according to an example embodiment may perform an initialization operation, a user modification operation, and an automatic modification operation based on inclination information acquired using a 3-axis sensor installed inside a pilot display unit (PDU). Here, when comparing scanned images through the laser scanner 100 of the aircraft, the 3-axis sensor (capable of measuring pitch, roll, and yaw) modifies three axes of the PDU. The 3-axis sensor may be installed in the PDU and may be configured to transmit and receive data according to communication with a main PC through serial communication.

Hereinafter, a method of detecting and modifying a displacement using the 3-axis sensor of the aircraft docking guidance system is described.

The aircraft docking guidance system includes the 3-axis sensor (pitch, roll, and yaw), and the 3-axis sensor monitors a displacement of a case by measuring the displacement of the case at regular time intervals and by comparing the measured displacement to set initial position information and automatically or manually modifies the displacement of the case.

When the case is fixed to a wall or a pole at an initial installation of the aircraft docking guidance system, 3-axis information (pitch, roll, and yaw) of the 3-axis sensor is stored in the system and is set as an initial value. The system detects a displacement occurrence by acquiring current 3-axis information from the 3-axis sensor at regular time intervals and by comparing a value of the 3-axis information to the initial value. Here, a sensor error and displacement tolerance are considered by placing a tolerance.

When a displacement difference beyond the tolerance is measured, the system applies the displacement tolerance to a 3-axis modification value of a scanner and changes 3-axis information of the scanner set at the initial installation. The 3-axis information of the scanner is 3-axis information of the scanner relative to the case.

When three axes of the scanner are not automatically modified for stability issues regardless of occurrence of the displacement or when a displacement beyond a modification tolerance occurs, an operator needs to manually modify the displacement again. This requires 3-axis calibration or the scanner and the case, which is the same as in the initial installation.

A method of controlling the 3D laser scanner may be implemented using a two-dimensional (2D) laser scanner and a step motor. Hereinafter, the method of controlling the 3D laser scanner using the 2D laser scanner and the step motor is described.

The 3D laser scanner may be manufactured by mechanically combining the 2D laser scanner and the step motor. Such a mechanism enables 3D scanning in such a manner that the 2D laser scanner vertically moves in response to rotation of the step motor through combination with a rotating portion of the step motor based on an origin of a laser light source of the 2D laser scanner.

To extract 3D data, an angle of the step motor and a distance and an angle of each point of the laser scanner are acquired through communication from each device and converted to 3D data. When information of each device is acquired through communication, an error occurs due to a communication velocity and a communication latency of each device. To remove the error, synchronization may be performed using RTC (Remote Time Clock) of each device.

Even with perfect RTC synchronization, each information is acquired at a different point in time. Therefore, RTC of the scanner is used as a standard and step motor information arrives after a predetermined period of time elapses. Therefore, a motor angle is predicted at a scanner information acquisition time by a difference between a moving speed of the motor and RTC of a scanner motor.

2D scan data refers to a diagonal distance of 3D coordinates according to the motor angle and 3D absolute coordinates are calculated based on the scanner according to a formula for calculating each of a 3D diagonal distance, a scan angle, and a motor angle.

A 3D coordinate calculation process continuously requests, collects, and calculates information of the 2D scanner and the motor and generates 3D data in real time. If necessary, an upper process requests the 3D coordinate calculation process for current 3D data. The 3D coordinate calculation process responds to the request from the upper process.

In relation to 3D data of the 3-axis sensor, the aircraft controller 600 may be configured to acquire inclination information (pitch, roll, and yaw) corresponding to the respective axes using the 3-axis sensor installed in the PDU. The aircraft controller 600 may be configured to perform the initialization operation of storing the acquired inclination information in the database 200 as the initial value.

The aircraft controller 600 may be configured to acquire inclination the inclination information of the respective axes using the 3-axis sensor of the PDU, to compare the acquired inclination information to the initial value, and to determine whether of deviation from an allowable value. In response to deviation from the allowable value through comparison to the initial value, the aircraft controller 600 may notify the user through the PDU and may perform a user modification operation of modifying three axes of the 3D scanner using a maintenance tool (MTT).

In response to deviation from the allowable value through comparison to the initial value, the aircraft controller 600 may perform an automatic modification operation. Here, the aircraft controller 600 may be configured to acquire the inclination information of the respective axes using the 3-axis sensor of the PDU, to compare the acquired inclination information to the initial value, and to determine whether of deviation from the allowable value. In response to deviation from the allowable value through comparison to the initial value, the aircraft controller 600 may perform the automatic modification operation of automatically modifying a 3-axis inclination value of the 3D scanner and storing the modified value as the initial value.

The aircraft controller 600 according to an example embodiment may be configured to set a centerline for guiding the aircraft. To this end, the aircraft controller 600 may be configured to place three points of a scannable object at a start point and an end point from the centerline on a stand in which the aircraft is to dock, and to scan the stand using the 3D scanner. The aircraft controller 600 may display a start point object of the centerline to be clicked on a screen generated with scanned data, and when the object is clicked on the screen, may designate the clicked object as a first point (FP) of the centerline.

Also, the aircraft controller 600 may display an end point object of the centerline to be clicked on the screen generated with the scanned data, and may click the object on the screen and designate the clicked object as a second point (SP) of the centerline. Therefore, the aircraft controller 600 may be configured to set the centerline for guiding the aircraft using the FP and the SP.

The aircraft docking guidance system according to an example embodiment may modify a 3-axis inclination value of the PDU according to a difference between an initial installation value at an initial installation of the PDU and a subsequent measurement value. Here, the aircraft controller 600 may be configured to store the initial installation value using the 3-axis sensor at the initial installation of the PDU and to compare the initial value and the measurement value at regular time intervals. When the difference between the initial value and the measurement value exceeds an allowable value, the aircraft controller 600 may notify that the difference exceeds the allowable value through the PDU and a main control panel (MCP). The aircraft controller 600 may be configured to modify the 3-axis inclination value of the PDU such that the difference between the initial value and the measurement value does not exceed the allowable value.

The aircraft docking guidance system according to an example embodiment may be implemented to learn a stop error due to a time difference when guiding the aircraft to stop. To this end, the aircraft controller 600 may be configured to recognize a stop sign displayed when guiding the aircraft to stop and to learn the stop error due to the time difference between a point in time at which a stop sign displayed when guiding the aircraft to stop is recognized and a point in time at which the aircraft is stopped, using bigdata.

Hereinafter, a pilot display device control method of an operating system server is described.

The operating system server receives ground aircraft movement information having a unique identifier for each flight from an upper linked airport system and remotely controls a pilot display device of an apron by prioritizing an aircraft corresponding to a closest time based on arrival time of the ground aircraft movement information.

Hereinafter, a sequence management method in the pilot display device control method of the operating system server is described.

Following the pilot display device control method of the operating system server, a control sequence is generated by determining an identifier of ground aircraft movement information, an error data inspection of an arrival time and a departure time, and when the departure time passes a current time. The generated control sequence is used to distinguish an aircraft towed by a vehicle and an aircraft parked by a pilot and to determine whether to provide view guidance information of the pilot display device. Whether the pilot display device is in operation is determined and a collision between adjacent center guidance lines of a single apron in which a plurality of pilot display devices. is installed is prevented. By activating the pilot display device before a time set by the user, safe and smooth docking, that is, approaching information and guidance information is provided to operators and pilots. An identifier of ground aircraft movement information, an aircraft model, and an activation time of the control sequence performed through the above process is recorded as a file in the operating system server and thereby managed.

Hereinafter, a method of controlling the pilot display device according to a change in the control sequence is described.

The system compares real-time ground aircraft movement information received from the upper linked airport system to a file recorded in the system, detects a change in main information, for example, an identifier of ground aircraft movement information, determines whether to control the pilot display device, and performs a following action. When an apron is changed on the pilot display device due to a change in the ground aircraft movement information, the change of the apron is controlled by controlling the pilot display device. The system determines an arrival time according to the change in the ground aircraft movement information and when the arrival time is changed, controls an operation time of the pilot display device. When a model of the aircraft is changed due to the change in the ground aircraft movement information, the aircraft model of the pilot display device is changed.

Hereinafter, a manual input method of control sequence is described. For all the control sequences, a user may input all information in an operating system control program.

Also, it is possible to automatically adjust a displaying timing of a stop sign displayed when guiding the aircraft to stop through learning different types of data.

Here, the aircraft controller 600 may be configured to store first type data that includes a distance indicating the stop sign displayed when guiding the aircraft to stop, a distance at which the aircraft is stopped, the stop error, and an aircraft model. The aircraft controller 600 may be configured to store second type data related to an environmental factor that includes weather associated with rain, snow, and fog, a PDU installation height, and a PDU installation angle. The aircraft controller 600 may perform statistics and learning on the first type data and the second type data by using an aircraft model, a stopping distance, and the environmental factor. Therefore, the aircraft controller 600 may be configured to automatically adjust a display timing of the stop sign displayed when guiding the aircraft to stop using the learned first type data and second type data.

The aircraft docking guidance system using the 3D laser scanner according to an aspect is described above. Hereinafter, an aircraft docking control method using the aircraft docking guidance system using the 3D laser scanner according to another aspect is described.

Figure 3:
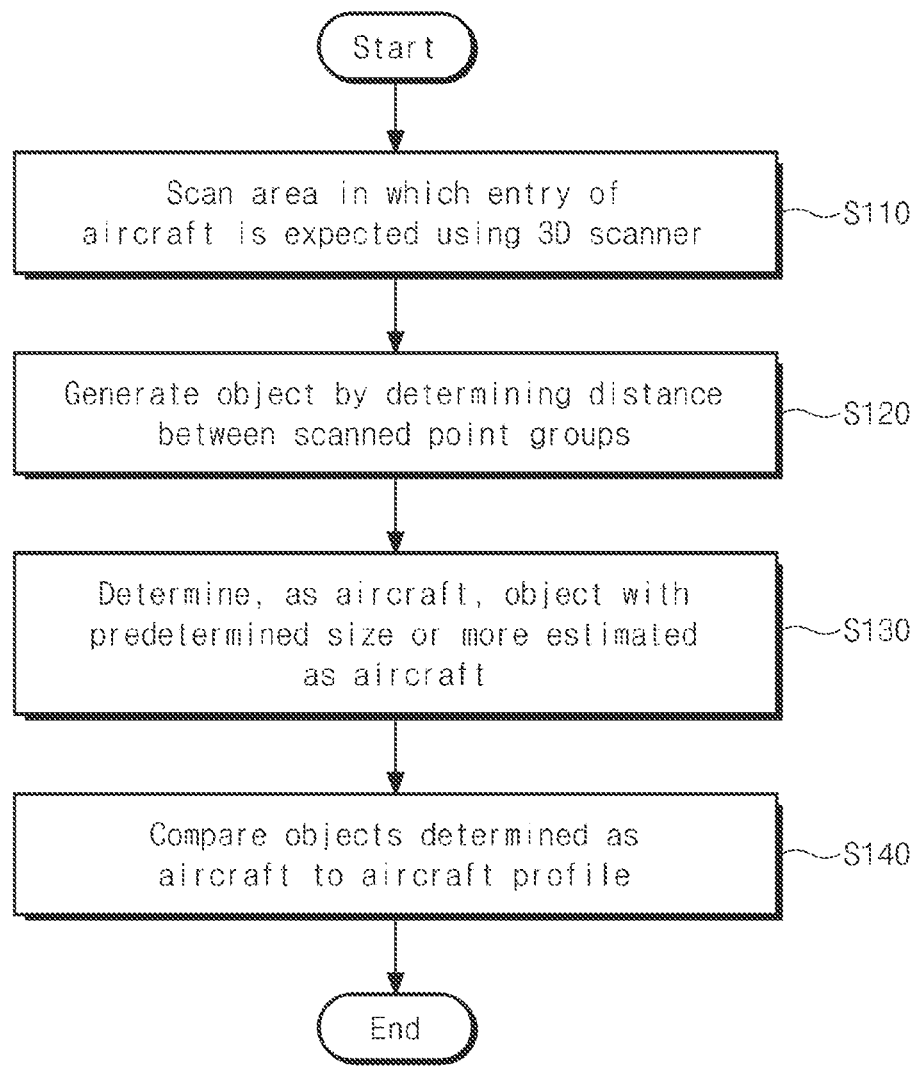
FIG. 3 is a flowchart illustrating an example of a method of identifying an aircraft and a model of the aircraft in an aircraft docking control method according to an example embodiment.

Initially, a method of identifying an aircraft and an aircraft model using the laser scanner 100 may be implemented as follows. FIG. 3 is a flowchart illustrating an example of a method of identifying an aircraft and a model of the aircraft in an aircraft docking control method according to an example embodiment. Referring to FIG. 3, the aircraft and aircraft model identification method may include the following first operation S110 to fourth operation S140.

In first operation S110, an area in which entry of an aircraft is expected is scanned using the 3D scanner.

In second operation S120, an object is generated by determining a distance between scanned point groups.

In third operation S130, an object with a predetermined size or more (estimated as the aircraft) is determined as the aircraft.

In fourth operation S140, objects determined as the aircraft are compared to an aircraft profile. Here, the aircraft profile refers to information about aircraft specifications that includes a length, a height, a width, an engine-to-engine distance, and an engine size of the aircraft.

Figure 4:
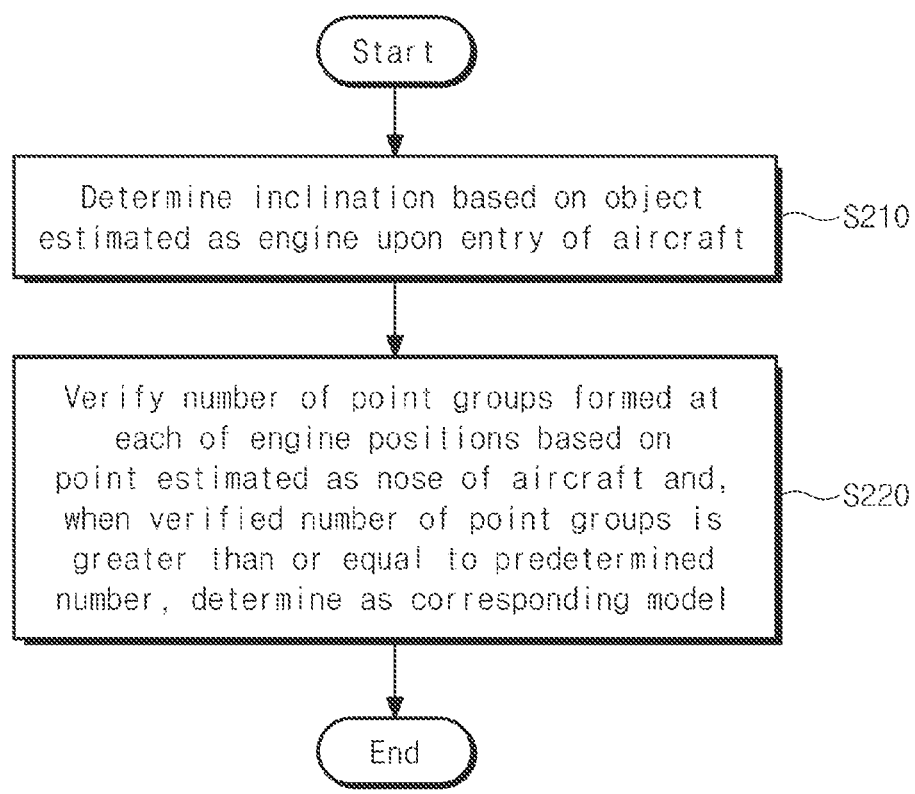
FIG. 4 is a flowchart illustrating an example of a method of comparing scanned images in an aircraft docking control method according to an example embodiment.

A method of comparing images scanned by the laser scanner 100 may be implemented as follows. FIG. 4 is a flowchart illustrating an example of a method of comparing scanned images in an aircraft docking control method according to an example embodiment. Referring to FIG. 4, the method of comparing scanned images may include first operation S210 and second operation S220.

In first operation S210, since the aircraft does not enter in front, an inclination is determined based on an object that is estimated as an engine.

In second operation S220, a number of point groups formed at each of both engine positions is verified based on a point that is estimated as a nose of the aircraft and when the verified number of point groups is greater than or equal to a predetermined number, it is determined as a corresponding model.

Figure 5:
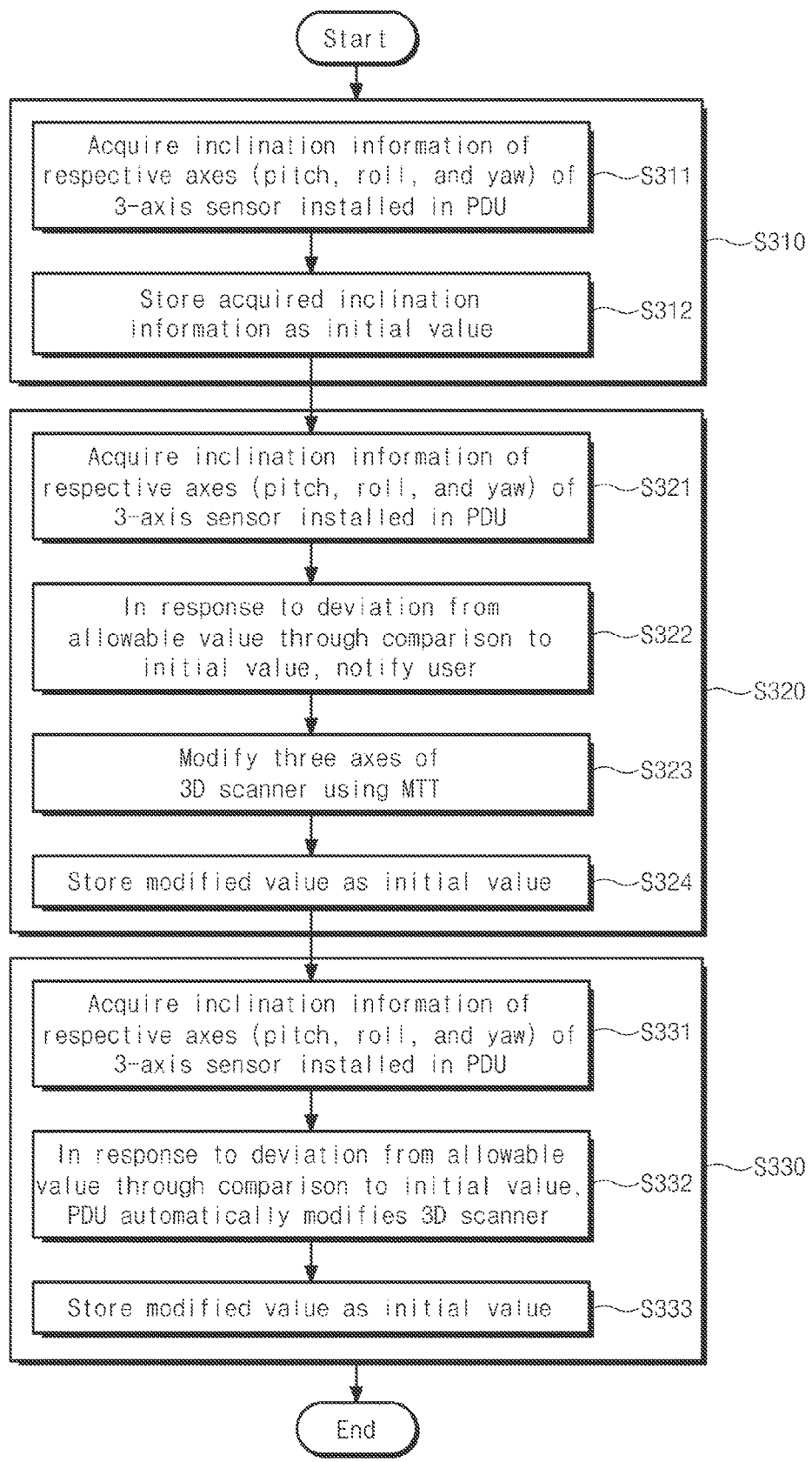
FIG. 5 is a flowchart illustrating an example of a method of initializing and modifying 3-axis data according to an example embodiment.

Also, when comparing images scanned by a scanner of the aircraft, the 3-axis sensor (capable of measuring pitch, roll, and yaw) installed in the PDU may modify three axes of the PDU. The 3-axis sensor installed in the PDU is configured to transmit and receive data according to communication with a main PC through serial communication. Therefore, the following initialization operation, user modification operation, and automatic modification operation may be performed through the 3-axis sensor. FIG. 5 is a flowchart illustrating an example of a method of initializing and modifying 3-axis data according to an example embodiment. Although FIG. 5 sequentially illustrates initialization operation S310, user modification operation S320, and automatic modification operation S330, user modification operation S320 and automatic modification operation S330 are not limited to order.

Initialization operation S310 may be configured to include first operation S311 and second operation S312.

In first operation S311, inclination information of the respective axes (pitch, roll, and yaw) of the 3-axis sensor installed in the PDU is acquired.

In second operation S312, the acquired inclination information is stored and maintained as an initial value.

User modification operation S320 may be configured to include first operation S321 to fourth operation S324.

In first operation S321, the inclination information of the respective axes (pitch, roll, and yaw of the 3-axis sensor installed in the PDU is acquired.

In second operation S322, in response to deviation from an allowable value through comparison to the initial value, the user is notified.

In third operation S323, the user is allowed to modify three axes of the 3D scanner using a maintenance tool (MTT).

Here, whether it is outside an allowable range may be determined by comparing an initial value and a measurement value for each of three axes, that is, pitch, roll, and yaw, of the 3-axis sensor. Table 1 shows an example of an initial value, a measurement value, and an allowable value for each of the three axes.

TABLE 1

| Axis | Initial value | Measurement value | Allowable value |
| --- | --- | --- | --- |
| Pitch | 0.0 | −0.2 | ±0.1 |
| Roll | 0.0 | 0.5 | ±0.1 |
| Yaw | 0.0 | 0.0 | ±0.1 |

Referring to Table 1, values of pitch and roll exceed corresponding allowable values and corresponding axes of the 3D scanner are modified. The PDU performs calculation by applying a modification value to raw data collected by the 3D scanner.

In fourth operation S324, a modified value is stored as the initial value.

Automatic modification operation S330 may be configured to include first operation S331 to third operation S323.

In first operation S331, the inclination information of the respective axes (pitch, roll, and yaw) of the 3-axis sensor installed in the PDU is acquired.

In second operation S332, in response to deviation from the allowable value through comparison to the initial value, the PDU automatically modifies the 3D scanner.

In third operation S333, the modified value is stored as the initial value.

Here, referring to FIG. 1, the database 200 may be configured to store aircraft specifications and characteristics and to additionally store a new model. The communicator 300 may be configured to include a transceiver configured to transmit and receive data received from the laser scanner 100 to and from the database 200. The data analysis decision algorithm processing unit 400 may be configured to include an analysis algorithm for comparing the image information acquired through the laser scanner 100 and the aircraft specifications and characteristics stored in the database 200.

The display 500 may be configured to include a pilot guidance indicator for visualizing data analyzed by the data analysis decision algorithm processing unit 400.

The aircraft controller 600 may be configured to include a central control device, a remote control device, and an automatic control device for an aircraft docking guidance based on the data visualized on the display 500.

In the aircraft docking control method using the aircraft docking guidance system using the 3D laser scanner according to an example embodiment, the aircraft controller 600 sets a centerline for guiding the aircraft.

Figure 6:
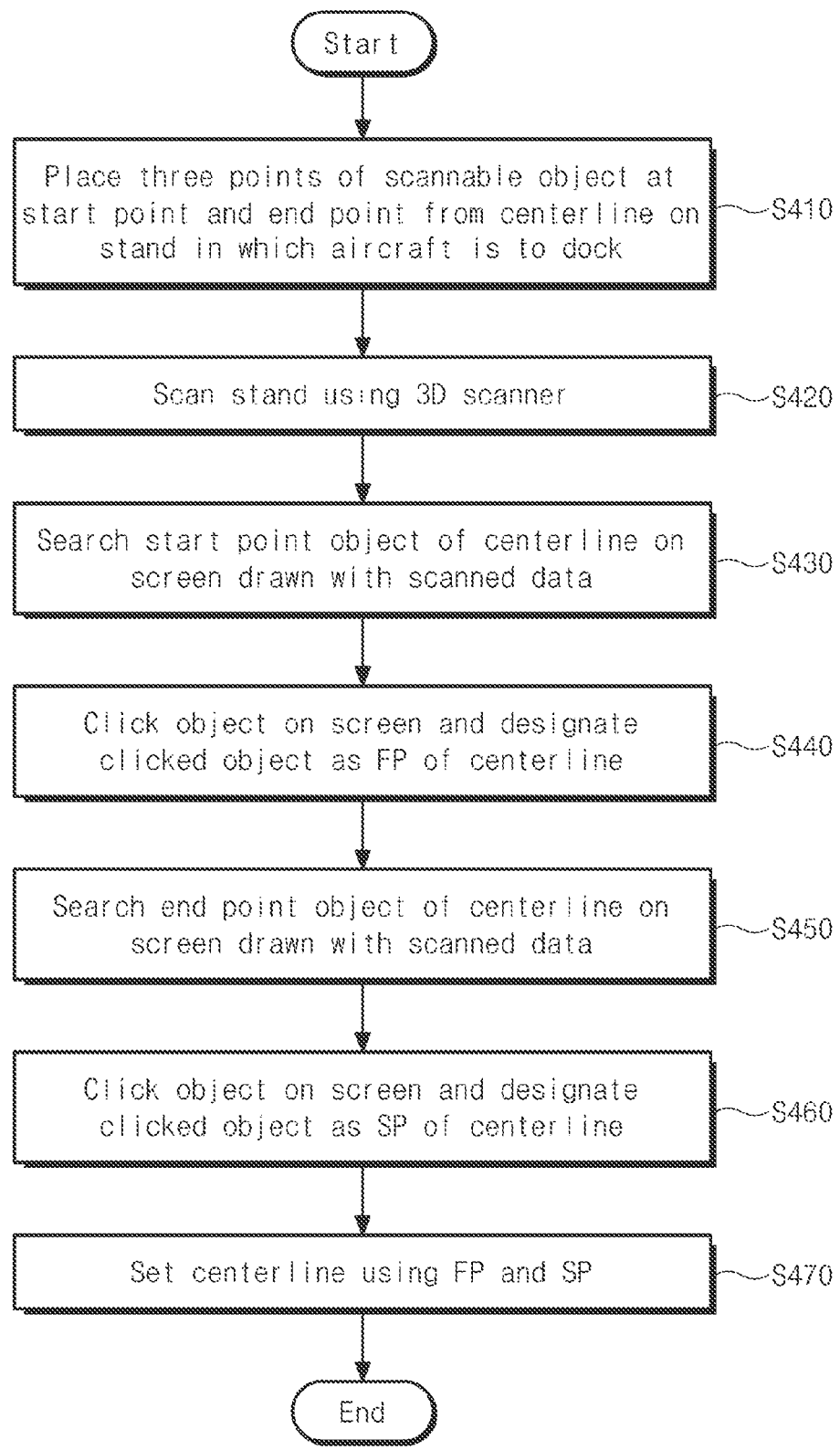
FIG. 6 is a flowchart illustrating an example of a method of setting a centerline to implement a central control, a remote control, and an automatic control for an aircraft docking guidance through an aircraft controller according to an example embodiment.

Here, a reference line is required to dock the airplane in a stand and the reference line is referred to as the centerline. FIG. 6 is a flowchart illustrating an example of a method of setting a centerline to implement a central control, a remote control, and an automatic control for an aircraft docking guidance through the aircraft controller 600 according to an example embodiment. Referring to FIG. 6, the method of setting the centerline to implement the central control, the remote control, and the automatic control for aircraft docking guidance may be configured to include first operation S410 to seventh operation S470.

In first operation S410, three points of a scannable object are placed at a start point and an end point from a centerline on a stand in which the aircraft is to dock.

In second operation S420, the stand is scanned using a 3D scanner.

In third operation S430, a start point object of the centerline is searched with naked eye on a screen drawn with scanned data.

In fourth operation S440, the object is clicked on the screen and is designated as a first point (FP) of the centerline.

In fifth operation S450, an end point object of the centerline is searched with the naked eye on the screen drawn with the scanned data.

In sixth operation S460, the object is clicked on the screen and is referred to as a second point (SP) of the centerline.

In seventh operation S470, the centerline is set using the FP and the SP.

In the aircraft docking control method using the aircraft docking guidance system using the 3D laser scanner, a method of verifying and correcting a physical distortion of a PDU case may be implemented. Here, FIG. 7 is a flowchart illustrating an example of a method of verifying and correcting a physical distortion of a PDU case according to an example embodiment. Referring to FIG. 7, the method of verifying and correcting the physical distortion of the PDU case may be configured to include first operation S510 to fourth operation S540. In detail, the method of verifying and correcting the physical distortion of the PDU case using a sensor capable of measuring a z axis (yaw), a y (pitch), and a x axis (roll) may be configured to include first operation S510 to fourth operation S540.

In first operation S510, a 3-axis sensor is installed at a center inside the PDU case and whether to operate for driving of the 3-axis sensor is verified.

In second operation S520, when initially installing the PDU, the 3-axis sensor is measured, an initial installation value is stored and an initial value and a measurement value are compared at regular time intervals.

In third operation S530, a difference between the initial value and the measurement value is calculated, and whether the difference exceeds a set allowable value is determined and displayed on the screen. When the difference exceeds the allowable value, a corresponding determination result is displayed on the PDU, a miniature circuit breaker (MCB), a manual control panel (MCP), and an operating system, to be verified by the user.

In fourth operation S540, the user modifies three axes of the PDU by referring to the measurement value and accuracy and reliability of the PDU is maintained. Here, the three axes of the PDU may be modified based on the measurement value.

Figure 8A:
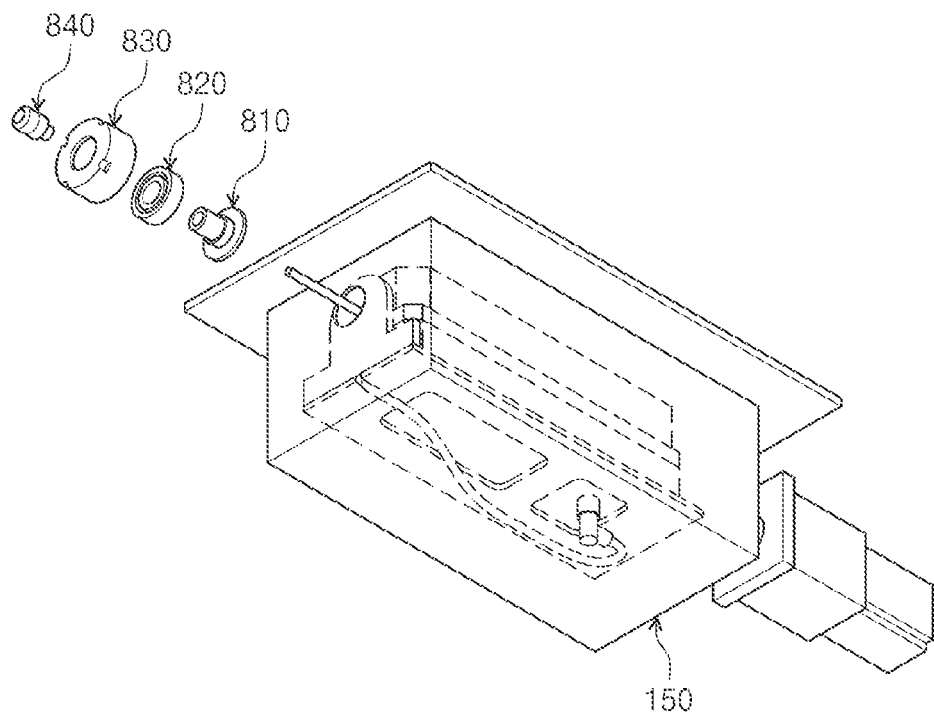
FIGS. 8A and 8B are perspective views illustrating a scanner configuration according to an example embodiment.
Figure 8B:
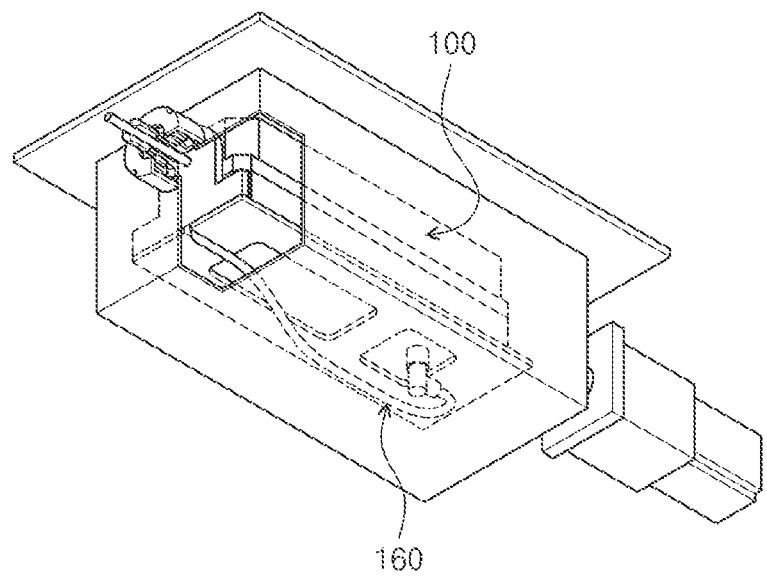

In the aircraft docking control method using the aircraft docking guidance system according to an example embodiment, a method of preventing damage to a cable assembled to a rotating part, for example a scanner, during a rotation operation and also preventing penetration of water may be constructed as follow. FIGS. 8A and 8B are perspective views illustrating a scanner configuration according to an example embodiment. A scanner may be configured as a 3D scanner, for example, the laser scanner 100. However, it is provided as an example only.

Referring to FIGS. 8A and 8B, a through-hole may be formed on one side of an encloser 150 in which the laser scanner 100 is provided and a cable 160 may be provided through the through-hole. A shaft 810, a bearing 820, and a bearing holder 830 may be fixedly provided in a peripheral area of the through-hole formed on one side of the encloser 150. A waterproof cable gland 840 may be configured to seal a space between the cable 160 and the shaft 810.

FIG. 9 is a flowchart illustrating a scanner assembly method for preventing a cable damage in an aircraft docking control method according to an example embodiment. Referring to FIG. 9, the scanner assembly method may be configured to include first operation S610 to third operation S630.

In first operation S610, a cable assembled to a rotating part, for example, a scanner, is assembled inside a through-hole of a shaft to not be damaged even during a rotation operation. That is, first operation S610 refers to an operation of providing the cable such that the cable inside the scanner passes through the through-hole of the shaft. When providing and assembling the cable, a degree of freedom is secured by a desired length in consideration of a change in a length due to a rotation of the cable.

In second operation S620, in the case of forming a hole and assembling the cable in a predetermined portion of an encloser of the scanner, 1) it is difficult to restrict a motion range of the cable and 2) there is a great concern that the cable may be damaged due to repeated load and continuous friction with the encloser when the rotating part rotates. Therefore, after providing the cable to pass through the through-hole of the shaft, the shaft is assembled to be fixed to the through-hole formed in the encloser of the scanner in second operation S620.

In third operation S630, an end of the shaft is attached to a waterproof cable gland to prevent water from entering from an outside. That is, third operation S630 refers to an operation of attaching the waterproof cable gland at the end of the shaft.

Figure 10:
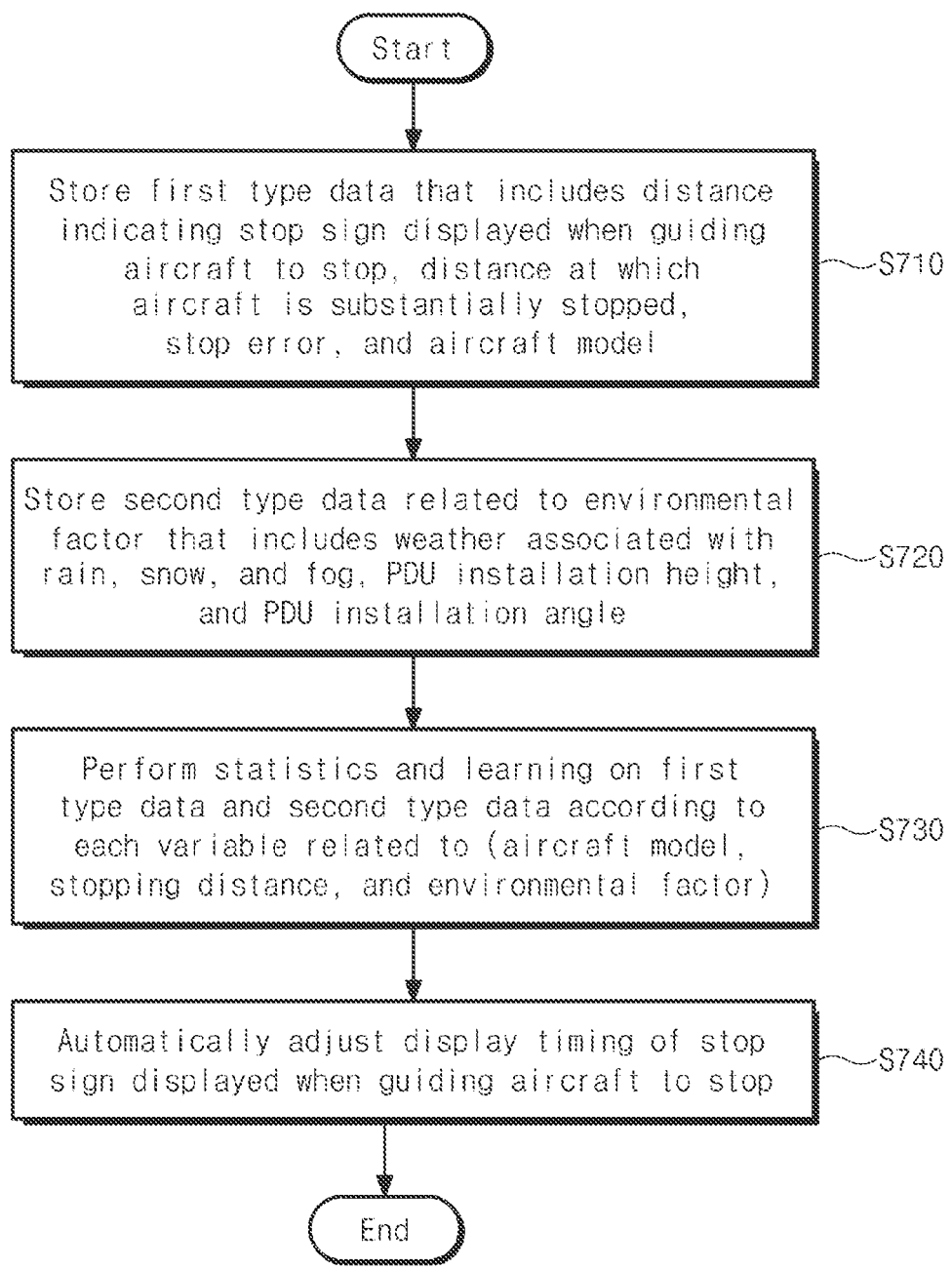
FIG. 10 is a flowchart illustrating a method of learning a stop error using bigdata when guiding an aircraft to stop according to an example embodiment.

In relation to the aircraft docking control method according to an example embodiment, when guiding an aircraft to stop, a stop error may be learned using bigdata. Here, FIG. 10 is a flowchart illustrating a method of learning a stop error using bigdata when guiding an aircraft to stop according to an example embodiment. Referring to FIG. 10, a method of learning and reducing, using bigdata, a stop error due to a time difference between a point in time at which a pilot recognizes a stop sign displayed when guiding the aircraft to stop and a point in time at which the aircraft is stopped may be configured to include first operation S710 to fourth operation S740.

In first operation S710, first type data that includes a distance indicating the stop sign displayed when guiding the aircraft to stop, a distance at which the aircraft is substantially stopped, a stop error, and an aircraft model is stored.

In second operation S720, second type data related to an environmental factor that includes weather associated with rain, snow, and fog, a PDU installation height, and a PDU installation angle is stored.

In third operation S730, statistics and learning on the first type data of first operation S710 and the second type data of second operation S720 is performed according to each variable related to (an aircraft model, a stopping distance, and the environmental factor).

In fourth operation S740, a display timing of the stop sign displayed when guiding the aircraft to stop is automatically adjusted using the learned data. Therefore, the pilot may accurately stop the aircraft at a stop line.

The aircraft docking guidance system using the 3D laser scanner and the aircraft docking control method using the same according to example embodiments are described above. Hereinafter, technical effects of the aircraft docking guidance system using the 3D laser scanner and the aircraft docking control method using the same according to example embodiments are described.

An aircraft docking guidance system using a 3D laser scanner and an aircraft docking control method using the same according to some example embodiments may scan a moving aircraft in real time using a laser and may acquire information, such as a shape (overall length, overall height, a fuselage size, an angle relative to a center, a centerline, etc.), a position, a distance, and a model of the aircraft as a 3D image.

Also, an aircraft docking guidance system using a 3D laser scanner and an aircraft docking control method using the same according to some example embodiments may operate both day and night by reducing a measurement error caused by weather effect, such as sunlight, fog, rain, and hail.

Also, an aircraft docking guidance system using a 3D laser scanner and an aircraft docking control method using the same according to some example embodiments may display a real-time situation on a pilot guidance indicator, may provide information through a manual control of an aircraft, and may perform a stable aircraft docking control through a central control device, a remote control device, and an automatic control device.

The features and effects of the disclosure will be apparent from the detailed description related to the accompanying drawings and accordingly those skilled in the art to which the disclosure pertains may easily implement the technical spirit of the disclosure.

Various modifications and/or alterations may be made to the disclosure and the disclosure may include various example embodiments. Therefore, some example embodiments are illustrated as examples in the drawings and described in detailed description. However, they are merely intended for the purpose of describing the example embodiments described herein and may be implemented in various forms. Therefore, the example embodiments are not construed as limited to the disclosure and should be understood to include all changes, equivalents, and replacements within the idea and the technical scope of the disclosure.

According to software implementation, not only procedures and functions described herein but also design and parameter optimization for the respective components may be implemented as a separate software module. A software code may be implemented as a software application written in a suitable program language. The software code may be stored in a memory and may be executed by a controller or a processor.

What is claimed is:

1. An aircraft docking guidance system using a three-dimensional (3D) laser scanner, the aircraft docking guidance system comprising:
a laser scanner configured to acquire data related to aircraft docking guidance and docking control;
a database configured to store information related to specifications and characteristics of each aircraft model that is a target of the aircraft docking guidance and docking control using the laser scanner;
a transceiver configured to transmit and receive information between the laser scanner and the database;
a processor configured to determine information of an object by comparing image information acquired through the laser scanner and information stored in the database;
a display configured to display information generated by the processor on a pilot guidance indicator; and
an aircraft controller configured to:
enable an automatic aircraft control based on information transmitted to the display, and
acquire inclination information of a 3-axis sensor, and in response to the inclination information deviating from an allowable value:
notify a user and modify three axes of the 3D scanner using a maintenance tool (MTT), or
automatically modify a 3-axis inclination value of the 3D scanner.

2. The aircraft docking guidance system of claim 1, wherein the laser scanner comprises:
a laser transceiver configured to emit a laser and receive the laser reflected by the object;
and
a camera configured to generate image data by scanning a centerline of the aircraft and a stand in which the aircraft is to dock.

3. The aircraft docking guidance system of claim 1, wherein the laser scanner is configured to scan characteristic point groups of objects within an area in which entry of the aircraft is expected using a 3D scanner, and
the processor is configured to, generate objects by determining distances between the point groups from the scanned point groups, and when the generated objects are determined as an object with a predetermined size or more that is estimated as the aircraft, compare the objects determined as the aircraft to an aircraft profile, and the aircraft profile is information about aircraft specifications that include a length, a height, a width, an engine-to-engine distance, and an engine size of the aircraft.

4. The aircraft docking guidance system of claim 3, wherein the processor is configured to, determine an inclination of an engine based on an object that is estimated as the engine upon entry of the aircraft, and verify a number of point groups formed at both engine positions based on a point that is estimated as a nose of the aircraft and when the verified number of point groups is greater than or equal to a predetermined number, determine a corresponding model of the aircraft.

5. The aircraft docking guidance system of claim 1, wherein the aircraft controller is configured to, perform an initialization operation of acquiring the inclination information of pitch, roll, and yaw corresponding to respective axes using the 3-axis sensor installed in a pilot display unit (PDU) and storing the acquired inclination information in the database as an initial value, and perform a user modification operation of acquiring the inclination information of the respective axes using the 3-axis sensor of the PDU, comparing the acquired inclination information to the initial value, and in response to the deviation from the allowable value, notifying the user through the PDU, and modifying the three axes of the 3D scanner using the MTT.

6. The aircraft docking guidance system of claim 1, wherein the aircraft controller is configured to, perform an initialization operation of acquiring the inclination information of pitch, roll, and yaw corresponding to respective axes using the 3-axis sensor installed in a PDU and storing the acquired inclination information in the database as an initial value, and perform an automatic modification operation of acquiring the inclination information of the respective axes using the 3-axis sensor of the PDU, comparing the acquired inclination information to the initial value, and in response to the deviation from the allowable value, automatically modifying the 3-axis inclination value of the 3D scanner and storing the modified value as the initial value.

7. The aircraft docking guidance system of claim 1, wherein the aircraft controller is configured to, place three points of a scannable object at a start point and an end point from a centerline on a stand in which the aircraft is to dock, scan the stand using a 3D scanner, display a start point object of the centerline to be clicked on a screen generated with scanned data, when the object is clicked on the screen, designate the clicked object as a first point (FP) of the centerline, display an end point object of the centerline to be clicked on the screen generated with the scanned data, click the object on the screen and designate the clicked object as a second point (SP) of the centerline, and set the centerline using the FP and the SP.

8. The aircraft docking guidance system of claim 1, wherein the aircraft controller is configured to, store an initial value for installation using the 3-axis sensor at an initial installation of a PDU and compare the initial value and a measurement value, when a difference between the initial value and the measurement value exceeds the allowable value, notify that the difference exceeds the allowable value through the PDU and a manual control panel (MCP), and modify the 3-axis inclination value of the PDU such that the difference between the initial value and the measurement value does not exceed the allowable value.

9. The aircraft docking guidance system of claim 1, wherein the aircraft controller is configured to learn a stop error due to a time difference a point in time at which a stop sign displayed when guiding the aircraft to stop is recognized and a point in time at which the aircraft is stopped, using bigdata.

10. The aircraft docking guidance system of claim 9, wherein the aircraft controller is configured to, store first type data that includes a distance indicating the stop sign displayed when guiding the aircraft to stop, a distance at which the aircraft is stopped, the stop error, and an aircraft model, store second type data related to an environmental factor that includes weather associated with rain, snow, and fog, a PDU installation height, and a PDU installation angle, perform statistics and learning on the first type data and the second type data by using an aircraft model, a stopping distance, and the environmental factor, and automatically adjust a display timing of the stop sign displayed when guiding the aircraft to stop using the learned first type data and the second type data.

\* \* \* \* \*